(12) United States Patent
Wang et al.

(10) Patent No.: US 12,112,138 B2
(45) Date of Patent: Oct. 8, 2024

(54) SYSTEMS AND METHODS FOR AN END-TO-END EVALUATION AND TESTING FRAMEWORK FOR TASK-ORIENTED DIALOG SYSTEMS

(71) Applicant: Salesforce, Inc., San Francisco, CA (US)

(72) Inventors: Guangsen Wang, Singapore (SG); Samson Min Rong Tan, Singapore (SG); Shafiq Rayhan Joty, Singapore (SG); Gang Wu, Santa Clara, CA (US); Chu Hong Hoi, Singapore (SG); Ka Chun Au, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 349 days.

(21) Appl. No.: 17/830,889

(22) Filed: Jun. 2, 2022

(65) Prior Publication Data
US 2023/0237275 A1    Jul. 27, 2023

Related U.S. Application Data

(60) Provisional application No. 63/303,850, filed on Jan. 27, 2022.

(51) Int. Cl.
| | | |
|---|---|---|
| *G06F 40/35* | (2020.01) | |
| *G06F 40/186* | (2020.01) | |
| *G06F 40/40* | (2020.01) | |
| *H04L 51/02* | (2022.01) | |

(52) U.S. Cl.
CPC ............ *G06F 40/35* (2020.01); *G06F 40/186* (2020.01); *G06F 40/40* (2020.01); *H04L 51/02* (2013.01)

(58) Field of Classification Search
CPC ........ G06F 40/35; G06F 40/186; G06F 40/20; G06F 40/40; G06F 40/30; G06F 40/56; H04L 51/02
See application file for complete search history.

(56) References Cited

U.S. PATENT DOCUMENTS

| | | | | |
|---|---|---|---|---|
| 9,473,637 | B1* | 10/2016 | Venkatapathy | ....... G06F 40/216 |
| 2009/0306995 | A1* | 12/2009 | Weng | ................... G06Q 10/103 |
| | | | | 704/235 |
| 2023/0063131 | A1* | 3/2023 | Sengupta | ................ G06F 40/35 |

OTHER PUBLICATIONS

Raffel et al., "Exploring the limits of transfer learning with a unified text-to-text transformer", arXiv preprint arXiv: 1910.10683, 2019, 67 pages.

(Continued)

*Primary Examiner* — Huyen X Vo
(74) *Attorney, Agent, or Firm* — Haynes and Boone, LLP

(57) ABSTRACT

Embodiments provide a software framework for evaluating and troubleshooting real-world task-oriented bot systems. Specifically, the evaluation framework includes a generator that infers dialog acts and entities from bot definitions and generates test cases for the system via model-based paraphrasing. The framework may also include a simulator for task-oriented dialog user simulation that supports both regression testing and end-to-end evaluation. The framework may also include a remediator to analyze and visualize the simulation results, remedy some of the identified issues, and provide actionable suggestions for improving the task-oriented dialog system.

20 Claims, 10 Drawing Sheets

(56) References Cited

OTHER PUBLICATIONS

Wolf et al., Huggingface's transformers: State-of-the-art natural language processing, arXiv 1910.03771, 2020, 8 pages.
Zhang et al., Pegasus: Pretraining with extracted gap-sentences for abstractive summarization, arXiv 1912.08777, 2019, 12 pages.

* cited by examiner

Algorithm 1 Rules for responding system "request" dialog acts entity_slot ← dialog_act[request_slot]
if entity_slot in goal[inform_slots] then     ▷ requested slot has value in current goal
    state[dialog_act] ← inform;   state[request_slots].clear()
    state[inform_slots][entity_slot] ← goal[inform_slots][entity_slot]
    state[rest_slots].pop(entity_slot, None)
    state[history_slots][entity_slot] = goal[inform_slots][entity_slot]
else if entity_slot in goal[request_slots] and entity_slot in state[history_slots] then
    state[dialog_act] ← request
    state[inform_slots][entity_slot] ← state[history_slots][entity_slot]
    state[request_slots].clear()
else if entity_slot in goal[request_slots] and entity_slot in state[rest_slots] then
    state[request_slots].clear();   state[dialog_act] ← request
    state[request_slots][entity_slot] ← UNK
else     ▷ requested entity not in goal, indicating an intent error
    state[dialog_act] ← FAIL;   state[inform_slots].clear()
    state[request_slots][entity_slot] ← UNK
end if

*FIG. 3*

Algorithm 2 Rules for responding "inform" system dialog acts

```
entity_slot, entity_value ← dialog_act[inform_slot], dialog_act[slot_value]
state[history_slots][entity_slot] ← entity_value
state[rest_slots].pop(entity_slot, None)              ▷ remove informed slot from the rest_slots stack
state[request_slots].pop(entity_slot, None)           ▷ remove informed slot from the current request stack
if entity_value != goal[inform_slots][entity_slot] then
    state[dialog_act] ← inform;   state[request_slots].clear()
    state[inform_slots][entity_slot] ← goal[inform_slots][entity_slot]
    state[history_slots][entity_slot] ← goal[inform_slots][entity_slot]
else
    if state[request_slots] then                      ▷ if still slots to request on the agenda
        state[dialog_act] ← request
    else if state[rest_slots] then                    ▷ if still slots remaining on the agenda
        slot, value = state[rest_slots].pop()
        if value != UNK then
            state[dialog_act] ← inform;   state[rest_slots].pop(slot)
            state[inform_slots][slot], state[history_slots][slot] ← value, value
        else
            state[dialog_act] ← request
            state[request_slots][slot] ← UNK
        end if
    else
        state[dialog_act] ← SUCCESS
    end if
end if
```

*FIG. 4*

| INTENT | MODEL F1 | SIMULATED CONVERSATIONS | SUCCESS (RATE) | INTENT ERRORS (RATE) | NER ERRORS (RATE) | OTHER ERRORS (RATE) |
|---|---|---|---|---|---|---|
| Check_the_status_of_an_existing_issue | 0.95 | 222 | 136(61%) | 19(9%) | 67(30%) | 0(0%) |
| Check_the_status_of_an_order | 0.96 | 205 | 149(73%) | 8(4%) | 48(23%) | 0(0%) |
| Connect_with_sales | 0.93 | 183 | 109(60%) | 16(9%) | 36(20%) | 22(12%) |
| End_Chat | 0.97 | 145 | 138(95%) | 7(5%) | 0(0%) | 0(0%) |
| Report_an_issue | 0.87 | 178 | 0(0%) | 26(15%) | 42(24%) | 110(62%) |
| Transfer_to_agent | 0.92 | 182 | 173(95%) | 9(5%) | 0(0%) | 0(0%) |

FIG. 5

| INTENT | SIMULATED CONVERSATIONS | PRECISION | RECALL | F1 | CLUSTER * |
|---|---|---|---|---|---|
| Check_the_status_of_an_existing_issue | 222 | 0.91 | 0.99 | 0.95 | 1 |
| Check_the_status_of_an_order | 205 | 0.96 | 0.96 | 0.96 | 0 |
| Connect_with_sales | 193 | 0.91 | 0.95 | 0.93 | 4 |
| End_Chat | 146 | 0.95 | 0.99 | 0.97 | 5 |
| Report_an_issue | 178 | 0.85 | 0.89 | 0.87 | 3 |
| Transfer_to_agent | 182 | 0.95 | 0.90 | 0.92 | 3 |

*FIG. 6*

| Model | Eval. | TA | EC | CS | CI | CO | RI |
|---|---|---|---|---|---|---|---|
| Baseline | original | 0.92±0.03 | 0.95±0.02 | 0.89±0.03 | 0.93±0.03 | 0.94±0.02 | 0.82±0.04 |
| | paraphr. | 0.88±0.01 | 0.93±0.01 | 0.85±0.01 | 0.91±0.01 | 0.93±0.01 | 0.77±0.02 |
| Retrained | original | 0.92±0.03 | 0.97±0.02 | 0.93±0.03 | 0.95±0.02 | 0.96±0.02 | 0.87±0.04 |
| | paraphr. | 0.89±0.01 | 0.94±0.01 | 0.90±0.01 | 0.94±0.01 | 0.94±0.01 | 0.80±0.02 |

FIG. 10

SYSTEMS AND METHODS FOR AN END-TO-END EVALUATION AND TESTING FRAMEWORK FOR TASK-ORIENTED DIALOG SYSTEMS

CROSS REFERENCES

The present disclosure is a nonprovisional of and claims priority under 35 U.S.C. 119 to U.S. provisional application No. 63/303,850, filed on Jan. 27, 2022, which is hereby expressly incorporated by reference herein in its entirety.

TECHNICAL FIELD

The embodiments relate generally to machine learning systems and natural language processing (NLP), and specifically to systems and methods for task-oriented dialog systems.

BACKGROUND

Task-oriented dialogue agents have been used to perform various tasks via conducting a dialogue with a human user, such as restaurant reservations, travel arrangements, meeting agenda, and/or the like. A typical dialog system development cycle may include dialog design, pre-deployment training and testing, deployment, performance monitoring, model improvement and iteration. Traditionally, evaluating and troubleshooting production task-oriented dialog (TOD) systems is largely performed by tedious manual labor.

BRIEF DESCRIPTION OF THE DRAWINGS

FIGS. 3-4 provide example rules for dialog acts according to some embodiments.

FIG. 5 provides dialog simulation results according to some embodiments.

FIG. 6 provides conversation analytics according to some embodiments.

FIG. 10 provides case study results according to some embodiments.

Figure 1:
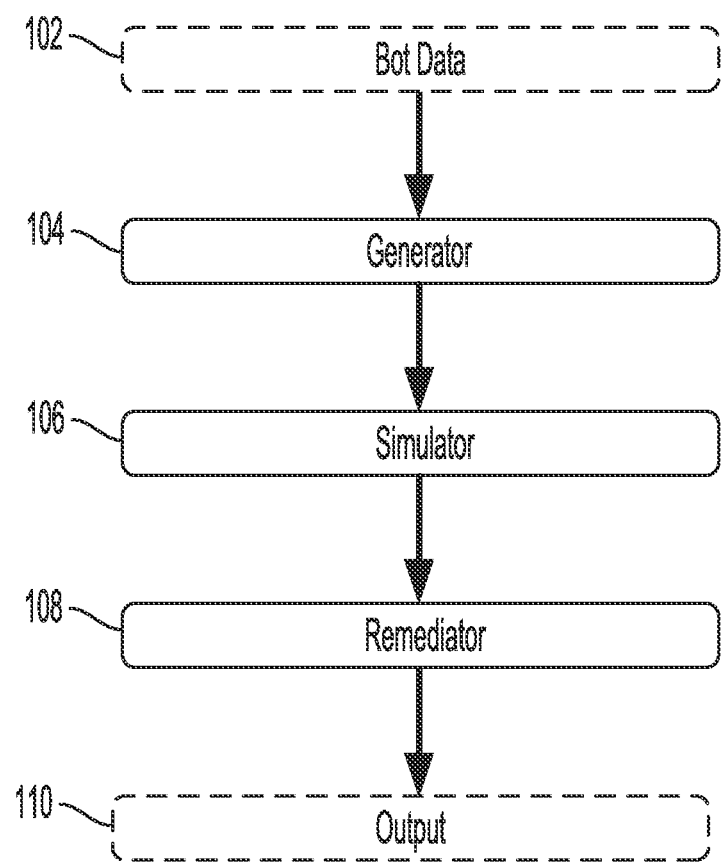
FIG. 1 provides an example simplified diagram illustrating an example system for simulating dialog, according to some embodiments.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Some existing commercial bot platforms may provide some test or analysis features to evaluate the performance of a chat system, they have the following limitations: first, most of them focus on regression testing, i.e., given some user input, the agent's response is compared to the ground-truth response to detect regressions. Second, bot users may manually create the test cases by either conversing with the bot or annotating chat logs. This process is time-consuming, expensive, and inevitably fails to capture the breadth of language variation present in the real world. The time- and labor-intensive nature of such an approach is further exacerbated when the developer significantly changes the dialog flows, since new sets of test dialogs will need to be created. Third, performing comprehensive end-to-end evaluation to understand both natural language understanding (NLU) and dialog-level performance (e.g., task success rate) is highly challenging due to the need for large numbers of annotated test dialogs. Finally, there is a lack of analytical tools for interpreting test results and troubleshooting underlying bot issues.

In view of the need for an efficient and accurate performance evaluation mechanism for chat systems, embodiments described herein provide modular end-to-end evaluation and testing framework for evaluating and troubleshooting real-world task-oriented bot systems. Specifically, the evaluation and testing framework may include a number of components, for example a generator, a simulator, and a remediator. The generator may infer dialog acts and entities from bot definitions and generate test cases for the system via model-based paraphrasing. The simulator may simulate a dialog between a bot and a user, which may be used to support both regression testing and end-to-end evaluation. The remediator may analyze and visualize the simulation results, remedy some of the identified issues, and provide actionable suggestions for improving the dialog system. The dialog generation and user simulation capabilities may allow the framework to evaluate dialog-level and task-level performance, in addition to the chatbot's natural language understanding (NLU) capability. In this way, the end-to-end framework may generate performance indicators by simulating a neural-model-based dialogue environment, with reduced needs of regenerating testing dialogues. Computational efficiency of the dialogue systems can be improved.

FIG. 1 provides an example simplified diagram illustrating an example system 100 for simulating dialog, according to some embodiments. As shown, the system 100 includes a generator 104, a simulator 106 and a remediator 108. The generator 104 takes bot data 102 as an input, for example bot metadata or content from an application programming interface (API). The generator 104 adopts sequence-to-sequence models to simulate lexical and syntactic variations in user queries. The generator 104 also produces various templates needed by the simulator. Templates may be in the form of a file that maps from dialog acts to utterances. For example, in JavaScript Object Notation (JSON).

To make the framework more platform and task agnostic, the simulator 106 adopts a dialog-act level agenda-based dialog user simulator (ABUS) to simulate conversations with bots via API calls. The agenda-based (task-oriented) dialog simulation enables both regression testing and performance evaluation with NLU and dialog-level metrics. In addition, other subtle dialog errors can also be captured via dialog simulation. Such errors include dialog loops or dead-ends, which often frustrate end users and cannot be easily identified via regression testing.

The remediator 108 summarizes the bot's health status in dashboards for easy comprehension. It also enables analysis of simulated conversations to identify any issues in a dialog system. It further provides actionable suggestions to remedy the identified issues.

Figure 2:
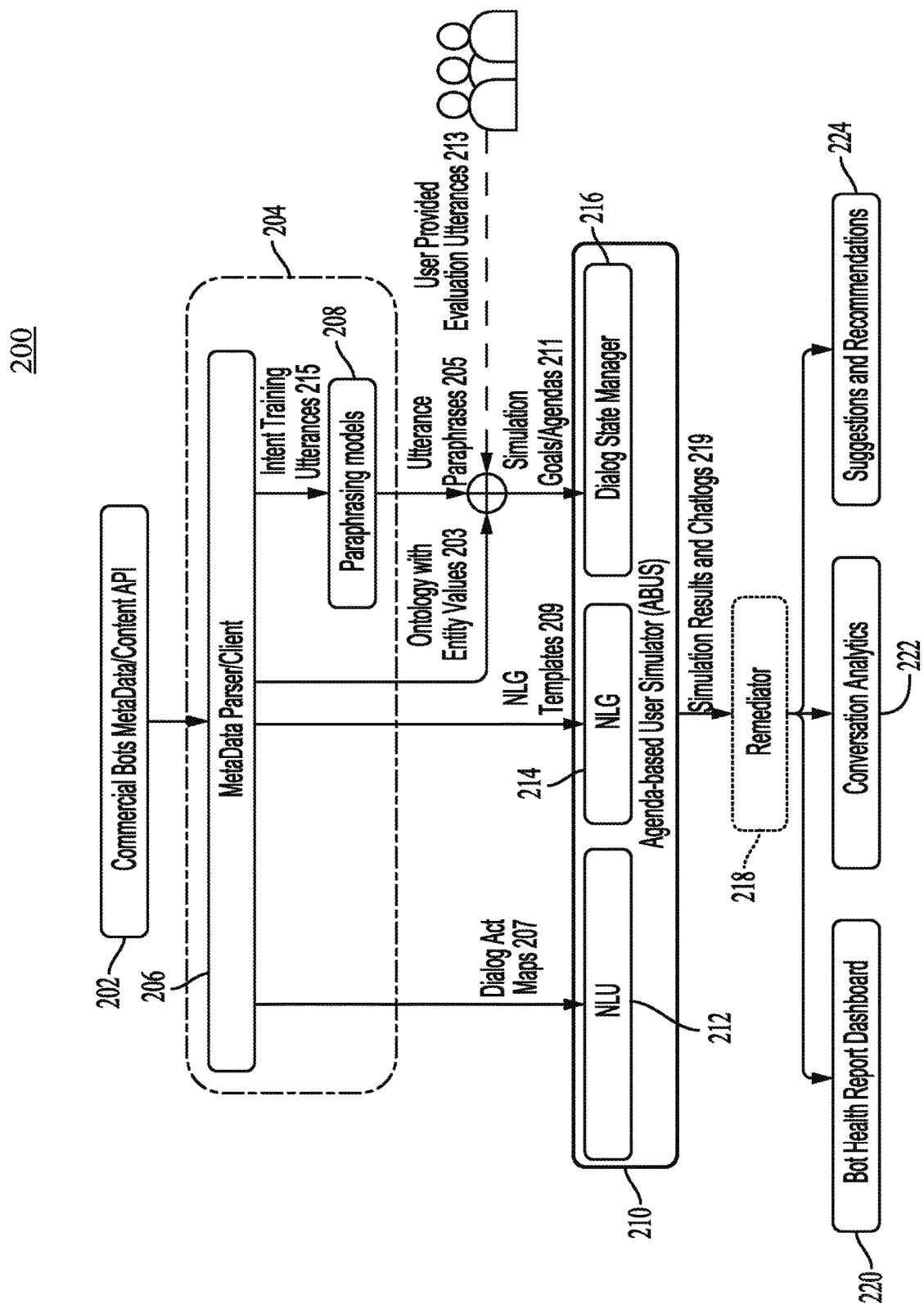
FIG. 2 illustrates an exemplary diagram for a simulated dialog system according to some embodiments.

FIG. 2 illustrates an exemplary diagram for an example process operating a simulated dialog system 200 comprising the generator, simulator and remediator described in FIG. 1, according to some embodiments. The system 200 takes bot metadata/content API data 202 as an input, which goes to generator 204. Generator 204 contains metadata parser/client 206 and paraphrasing models 208. Generator 204 takes the generic bot input, which may be in a variety of forms, and produces a uniform output which may be used by simulator 210. Generator 204 functions in a way which reflects that most commercial task-oriented dialog (TOD) bots adopt a "rule-action-message" design paradigm. There exist clear mappings between the system messages and the rules. It is therefore possible to infer dialog acts from the system responses and the bot metadata/definitions. For example, in a bot developed using commercial bot platform Salesforce Einstein, the utterance "May I get your email?" elicits the "Email" slot with entity type "Email" from the user (Similar mappings can be obtained via DialogFlow CX APIs, another commercial bot system). Therefore, this message can be mapped to the "request_Email" dialog act by the parser 206. At a higher level, the generator 204 takes the bot's MetaData as input and produces the configuration files to control the simulator. Specifically, the generator 204 outputs dialog act maps 207, natural language generation (NLG) templates 209, ontology with entity values 203, and utterance paraphrases 205.

In one embodiment, the dialog act maps 207 output by generator 204 serve as the basis for natural language understanding (NLU) module of simulator 210. The dialog act maps map system messages to dialog acts via fuzzy matching. The parser 206 takes in the bot metadata (e.g., Einstein BotBuilder) or calls the content API (e.g., DialogFlow) to output the template based NLU to associate bot messages with dialog acts. Two dialog acts, "dialog_success_message" and "intent_success_message", are used as golden labels indicating a successful dialog and a correct intent classification, respectively. To minimize human annotation efforts, these two dialog acts and their messages are generated heuristically by default (taking the first bot message as "intent_success_message" and last bot message as "dialog_success_mesage"). Users of system 200 may review these two dialog acts for each evaluation dialog definition to make sure they are faithful to the dialog design.

In one embodiment, the generator 204 also produces simulation goals/agendas 211. For agenda-based dialog simulation, an agenda is a stack-like structure comprising a set of dialog acts to respond to different bot dialog acts according to pre-defined rules. The goal entity slots are also extracted by the parser 206. All the entity value pairs in "inform_slots" are used to test bot NLU capabilities. The entity values are generated randomly according to some heuristics by default. As they are mostly product/service dependent, system 200 may have users replace these randomly generated values to real values to produce what is illustrated as ontology with entity values in FIG. 2. One special slot is the "intent" slot. It contains the intent queries generated by the paraphrasing models for pre-deployment testing or user-provided evaluation utterances for performance monitoring.

In one embodiment, the simulation goals/agendas 211 are generated via the metadata parser 206 and the paraphrasing models 208. The paraphrasing models 208 may receive intent training utterances 215 generated by the metadata parser 206 to produce simulation goals/agendas 211. For example, the paraphrasing models 208 may comprise a model such as T5-base as described in Raffel et al., Exploring the limits of transfer learning with a unified text-to-text transformer, arXiv:1910.10683, 2020. The T5-base model may be fine-tuned to produce a model for the paraphrasing task on a collection of corpora. To further improve the diversity, additional models may be used together, for example Pegasus as described in Zhang et al. Pegasus: Pre-training with extracted gap-sentences for abstractive summarization, arXiv 1912.08777, 2019; and Huggingface as described in Wolf et al., Huggingface's transformers: State-of-the-art natural language processing, arXiv 1910.03771, 2020. These models are exemplary, and other models may be used. The paraphrasing models 208 take intent training utterances 215 as input and output their top N utterance paraphrases by beam search. The paraphrases are subsequently filtered by discarding candidates with low semantic similarity scores and small edit distances. Paraphrases may then be used either to generate multiple paraphrases stored in the NLG templates 209, or for use by the dialog state manager 216 as alternative utterances as values associated with an entity value slot. For example, utterance paraphrases may be used to give multiple options for response values in the ontology with entity values, in addition to any user-provided evaluation utterances 213 as illustrated. Together, these produce the simulation goals/agendas used by simulator 210.

In one embodiment, the generator 204 produces NLG templates. In order to perform end-to-end evaluation, the user dialog acts have to be converted to natural language utterances. The NLG templates serve as the language generator for system 200. The templates may be maintained as a JSON file to map from dialog acts to delexicalized utterances. For example, a dialog act may include the utterance "I had a problem with my order and I would like to know if there is an update." The template may associate the dialog act with multiple "classified_intents" including "Check_the_status_of_an_order" and "Report_an_issue." Each of the "classified_intents" may have a number of utterance paraphrases associated with them. For example, the "Check_the_status_of_and_order" may have utterances "I'm unsure if there is a update on my order," "My order got stuck, so I want to know if there's an update," and "Do you know if there is an update on my order?"

Simulator 210 includes natural language understanding (NLU) module 212, natural language generation (NLG) module 214, and dialog state manager 216. The simulator 210 may be implemented by a dialog-act-level agenda-based dialog user simulator (ABUS). In some situations, an ABUS simulator may be advantageous. For example, when system 200 is used to for commercial use cases, simulation duration and computation are no longer functional considerations. In this case, NUS inference may need GPUs, which can significantly increase the barrier to entry and operational cost. In addition, NUS may need large amounts of annotated data to train and are prone to overfitting. Also, dialogue-act-level simulation is more platform- and task-agnostic, which favors the ABUS simulator.

In one embodiment, the simulator 210 can be viewed as a dialog agent with its own standard components, namely NLU, NLG and dialog state manager. The NLU 212 may use dialog act maps provided by generator 204 to map bot messages to dialog acts via fuzzy matching. NLG 214 may use template-based NLG to convert user dialog acts to natural language responses. Given a dialog act, e.g., "request_Email", a response is randomly chosen from a set of corresponding templates with a "Email" slot, which is replaced by the value defined in the goal during conversation. The plug-and play user response templates can be constantly updated to include more variations as encountered in real world use cases.

Figure 9:
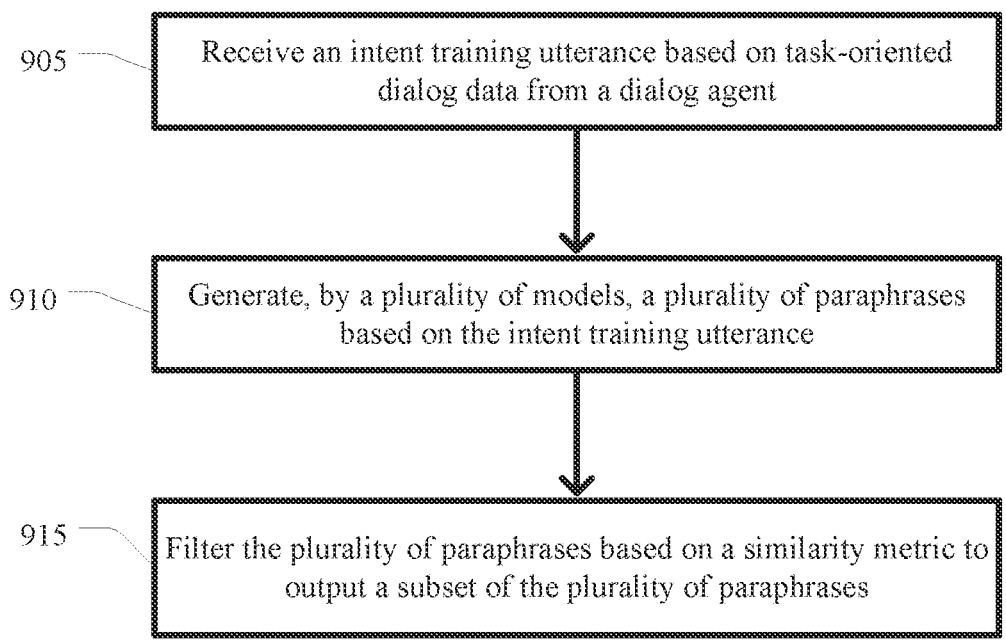
FIG. 9 provides an example logic flow diagram illustrating an example algorithm for paraphrase generation according to some embodiments.

The dialog state manager 216 maintains dialog states as a stack-like agenda. During simulation, user dialog acts are popped from the agenda to respond to different system dialog acts according to pre-defined rules. Two important dialog acts, namely "request" and "inform" are illustrated in FIGS. 9-10. The simulation is performed via APIs. BotSIM calls APIs to retrieve bot messages. Based on the dialog acts matched by the NLU, the state manager applies the corresponding rules to generate the user dialog acts. They are then converted to natural language responses and sent back to the bot via APIs. The conversation ends when the task has been successfully finished or an error has occurred.

The remediator module 218 receives the simulation results and chatlogs 219 generated by the simulator 210, based on which the remediator module 218 generates the bot health reports presented in bot health report dashboard 220, performs conversation analytics 222, and provides actionable suggestions and recommendations 224 to troubleshoot and improve dialog systems. In this way, the end-to-end framework may provide helpful information in the development of a bot by simulating a neural-model-based dialogue environment, with reduced needs of regenerating testing dialogues. Computational efficiency of the dialogue systems can be improved An Example report is shown and described in more detail with reference to FIG. 5. An exemplary conversation analytics report is illustrated in FIG. 6 and is described in more detail with reference to FIG. 6.

FIG. 3 provides an example rule for "request" dialog acts applied by the dialog state manager 216 and FIG. 4 provides an example rule for "inform" dialog acts applied by the dialog state manager 216 module, as described in relation to FIG. 2, according to some embodiments. These rules are provided for illustrative purposes, and other rules may be used. While most of the bot behaviors/messages can be converted to either the "request" dialog act, or the "inform" dialog act, users can customize or override these rules to simulate the behavior of their customers. They can also design new rules for novel dialog acts that may appear with new bot designs.

FIG. 5 provides an example report of dialog simulation results 219 generated by simulator 210 as described in FIG. 2, according to some embodiments. Given a test session, the health reports summarize the simulation results and provide detailed analyses for each tested intent. The major elements include a performance summary of both NLU and dialog level performance, and a detailed dashboard for each intent including the intent prediction distributions, NER error information, and the simulated conversations with highlighted errors. System 200 generates the performance reports by matching the "intent_success" and "dialog_success" messages in addition to checking the states of the simulation agenda. Backtracking of dialog acts in the simulation agenda is used to identify the user dialog turns leading to failed conversations. System 200 uses the loop detection algorithm to detect dead-ends and loops, and the longest repeating sub-string algorithm to locate the start of the loop.

FIG. 6 provides an example report of conversation analytics 222 generated by remediator 218 as described in FIG. 2, according to some embodiments. Remediator 218 may provide confusion matrices (not shown) for identifying confusion among intents and potential intent clusters, visualization of the sentence embeddings of intent training utterances to help evaluate the training data quality and discover intent overlaps, and bootstrap-based confidence analysis to compute the 95% confidence intervals. This helps users to compare different test results to see whether certain changes are statistically significant. Actionable recommendations for remediation. As the outputs of the remediator 218, they consist of actionable insights drawn from the analytics on the unsuccessful simulated dialogs. In addition to the dashboard views in the reports, the output data is also in the JSON format, allowing for easy verification and used for remediation. Users can apply the suggestions directly (e.g., data augmentation to retrain intent models) or use them as guidelines to troubleshoot and improve bots (e.g., re-design intents to resolve intents with significant overlaps).

Figure 7:
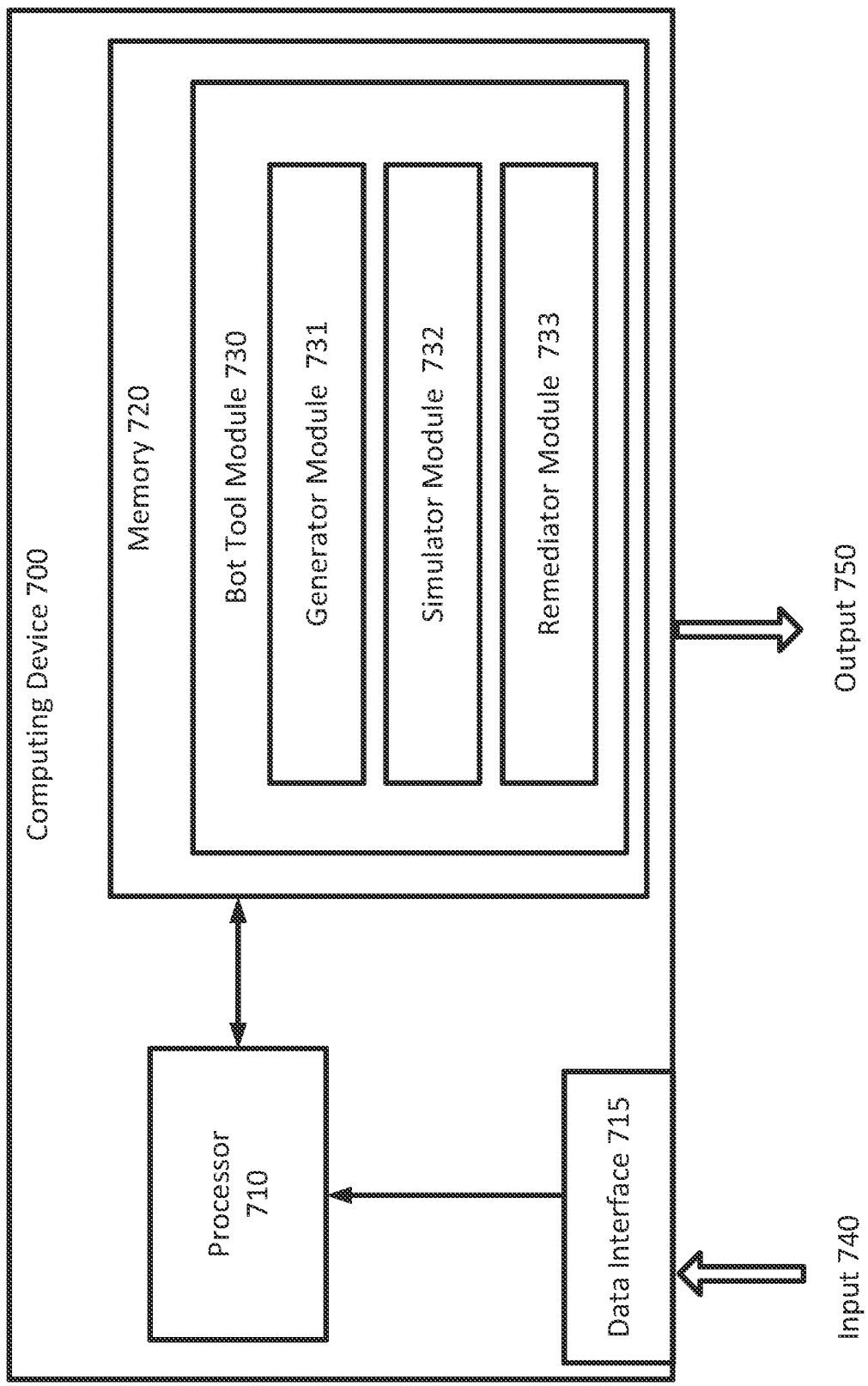
FIG. 7 is a simplified diagram of a computing device that performs dialog simulation according to some embodiments.

FIG. 7 is a simplified diagram of a computing device that performs dialog simulation according to some embodiments. As shown in FIG. 7, computing device 700 includes a processor 710 coupled to memory 720. Operation of computing device 700 is controlled by processor 710. And although computing device 700 is shown with only one processor 710, it is understood that processor 710 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 700. Computing device 700 may be implemented as a stand-alone subsystem, as a board added to a computing device, and/or as a virtual machine.

Memory 720 may be used to store software executed by computing device 700 and/or one or more data structures used during operation of computing device 700. Memory 720 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 710 and/or memory 720 may be arranged in any suitable physical arrangement. In some embodiments, processor 710 and/or memory 720 may be implemented on a same board, in a same package (e.g., system-in-package), on a same chip (e.g., system-on-chip), and/or the like. In some embodiments, processor 710 and/or memory 720 may include distributed, virtualized, and/or containerized computing resources. Consistent with such embodiments, processor 710 and/or memory 720 may be located in one or more data centers and/or cloud computing facilities.

In some examples, memory 720 may include non-transitory, tangible, machine readable media that includes executable code that when run by one or more processors (e.g., processor 710) may cause the one or more processors to perform the methods described in further detail herein. For example, as shown, memory 720 includes instructions for a bot tool module 730 that may be used to implement and/or emulate the systems and models, and/or to implement any of the methods described further herein. In some examples, the bot tool module 730, may receive an input 740, e.g., such as a text document, via a data interface 715. The data interface 715 may be a communication interface that may receive or retrieve previously stored documents from a database. The bot tool module 730 may generate an output 750, such as a simulated dialog or remediation suggestion based on input 740. In some embodiments, the bot tool module 730 may further include the generator module 731 (similar to generator 214 in FIG. 2), simulator module 732 (similar to simulator 210 in FIG. 2), and remediator module 733 (similar to remediator 218 in FIG. 2).

The generator module 731 is configured to perform functions as described with respect to generator 104 and 204 in FIGS. 1-2 and FIGS. 8-10. For example, generator module 731 may take a generic bot input, which may be in a variety of forms, and produce a uniform output which may be used by simulator module 732. Specifically, generator module 731 may produce dialog act maps, NLG templates, ontology with entity values, and a number of utterance paraphrases.

Figure 8:
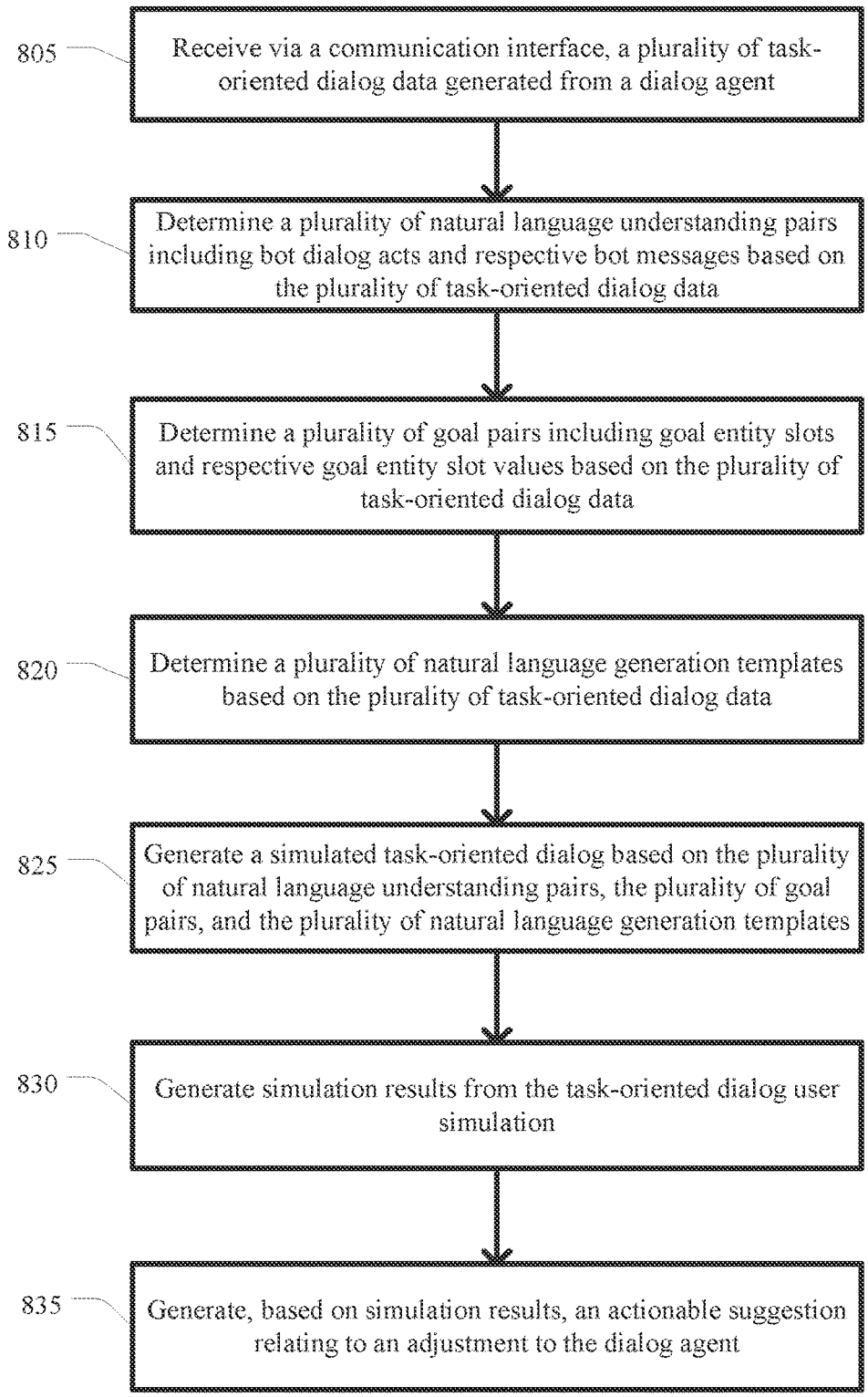
FIG. 8 provides an example logic flow diagram illustrating an example algorithm for dialog simulation according to some embodiments.

The simulator module 732 is configured to perform functions as described with respect to simulator 106 and 210 in FIGS. 1-2 and FIG. 8. For example, simulator module 732 may simulate dialogs between the bot and a user based on the output of the generator module 731 and any user provided evaluation utterances 213. The simulation may be performed by an NLU, NLG, and Dialog state manager as described with reference to FIG. 2.

The remediator module 733 is configured to perform functions as described with respect to remediator 108 and 218 in FIGS. 1-2 and FIG. 8. For example, remediator module 733 may generate bot health reports, perform conversation analytics, and provide actionable suggestions and recommendations to troubleshoot and improve dialog systems.

Some examples of computing devices, such as computing device 700 may include non-transitory, tangible, machine readable media that include executable code that when run by one or more processors (e.g., processor 710) may cause the one or more processors to perform the processes of methods described herein. Some common forms of machine-readable media that may include the processes of methods described herein are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

FIG. 8 provides an example logic flow diagram 800 illustrating an example process of dialog simulation based on system 200 described in FIG. 2, according to some embodiments. One or more of the processes described in FIG. 8 may be implemented, at least in part, in the form of executable code stored on non-transitory, tangible, machine-readable media that when run by one or more processors may cause the one or more processors to perform one or more of the processes 805-835. In some embodiments, flow diagram 800 may correspond to the method used by the bot tool module 730 in FIG. 7.

At step 805, a communication interface receives a plurality of task-oriented dialog data (e.g., commercial bots metadata/content API 202 in FIG. 2) generated from a dialog agent. Task-oriented dialog data may be in the form of bot metadata such as provided by a commercial bot platform. The task-oriented dialog data may also be in the form of responses to API calls, such as provided by an API-based commercial bot platform.

At step 810, a generator (e.g., generator 204 in FIG. 2) determines a plurality of natural language understanding pairs including bot dialog acts and respective bot messages based on the task-oriented dialog data. The data may be in a form that is easily readable by humans, as compared to the source dialog data from the dialog agent. For example, the bot dialog act may take a form of "I had a problem with my order and I would like to know if there is an update", and the respective bot message may take a form of "I'm unsure if there is an update on my order".

At step 815, the system determines a plurality of goal pairs including goal entity slots and respective goal entity slot values based on the plurality of task-oriented dialog data. For example, the goal entity slots are generated by generator 204 of FIG. 2. The entity slot values may be generated randomly according to some heuristics at initialization. As they are mostly product/service dependent, users may replace these randomly generated values to real values.

At step 820, the generator (e.g., generator 204 of FIG. 2) determines a plurality of natural language generation (NLG) templates based on the task-oriented dialog data. The NLG templates serve as the language generator for system 200. The templates may be maintained as a JSON file to map from dialog acts to delexicalized utterances.

At step 825, the generator generates a simulated task-oriented dialog based on the plurality of natural language understanding pairs, the plurality of goal pairs, and the plurality of natural language generation templates.

At step 830, a simulator (e.g., simulator 210 of FIG. 2) generates simulation results from the task-oriented dialog user simulation.

At step 835, a remediator (e.g., remediator 218 of FIG. 2) generates, based on simulation results, an actionable suggestion relating to an adjustment to the dialog agent. Users can apply the suggestions directly (e.g., data augmentation to retrain intent models) or use them as guidelines to troubleshoot and improve bots (e.g., re-design intents to resolve intents with significant overlaps).

FIG. 9 provides an example logic flow diagram 900 illustrating an example process for paraphrase generation performed by—module—shown in FIG. 2, according to some embodiments. One or more of the processes described in FIG. 9 may be implemented, at least in part, in the form of executable code stored on non-transitory, tangible, machine-readable media that when run by one or more processors may cause the one or more processors to perform one or more of the processes 905-915. In some embodiments, flow diagram 900 may correspond to the method used by the generator module 731 in FIG. 7.

At step 905, a communication interface receives an intent training utterance based on task-oriented dialog data from a dialog agent. Task-oriented dialog data may be in the form of bot metadata such as provided by a commercial bot platform. The task-oriented dialog data may also be in the form of responses to API calls, such as provided by an API-based commercial bot platform. The utterance may be an utterance associated with the dialog agent or a user that may communicate with the dialog agent.

At step 910, each of a plurality of models generates a plurality of paraphrases based on the intent training utterance. Paraphrasing models may comprise a model such as T5-base, Pegasus, and Huggingface. The paraphrasing models take the intent training utterance as input and output their top N paraphrases by beam search, where N is a preconfigured number.

At step 915, the plurality of paraphrases are filtered based on a similarity metric to output a subset of the plurality of paraphrases. The filtering may be performed by discarding candidates with low semantic similarity scores and small edit distances.

FIG. 10 provides case study results according to some embodiments. Specifically, before and after retraining the intent model with an augmented training set. Consistent improvements are illustrated for all intents with model retraining on the human-written "eval-original" set. More challenging intents (lower baseline F1 scores). F1 is an accuracy metric which accounts for imbalanced distribution of data classes. "RI" and "CS" saw larger performance gains compared to the easier ones such as "EC" (higher baseline F1 scores). This demonstrates the efficacy of the methods described herein and is likely due to more paraphrases being selected for retraining the model on the more challenging intents This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of simulating a dialog, the method comprising:
   receiving, via a communication interface, a plurality of task-oriented dialog data generated from a dialog agent;
   determining a plurality of natural language understanding pairs including bot dialog acts and respective bot messages based on the plurality of task-oriented dialog data;
   determining a plurality of goal pairs including goal entity slots and respective goal entity slot values based on the plurality of task-oriented dialog data;
   determining a plurality of natural language generation templates based on the plurality of task-oriented dialog data;
   generating a simulated task-oriented dialog based on the plurality of natural language understanding pairs, the plurality of goal pairs, and the plurality of natural language generation templates;
   generating simulation results from the simulated task-oriented dialog; and
   generating, based on simulation results, an actionable suggestion relating to an adjustment to the dialog agent.

2. The method of claim 1, wherein the plurality of task-oriented dialog data comprises responses to application programming interface (API) calls to the dialog agent.

3. The method of claim 1, wherein the plurality of task-oriented dialog data comprises metadata associated with the dialog agent.

4. The method of claim 1, further comprising:
   determining an intent training utterance based on the plurality of task-oriented dialog data.

5. The method of claim 4, further comprising:
   generating, by a plurality of models, a plurality of paraphrases based on the intent training utterance.

6. The method of claim 5, further comprising:
   filtering the plurality of paraphrases based on a similarity metric to produce a subset of the plurality of paraphrases.

7. The method of claim 6, further comprising:
   generating the simulated task-oriented dialog based on the subset of the plurality of paraphrases.

8. A system for dialog simulation, the system comprising:
   a communication interface that receives a plurality of task-oriented dialog data generated from a dialog agent; and
   one or more hardware processors that:
      determines a plurality of natural language understanding pairs including bot dialog acts and respective bot messages based on the plurality of task-oriented dialog data;
      determines a plurality of goal pairs including goal entity slots and respective goal entity slot values based on the plurality of task-oriented dialog data;
      determines a plurality of natural language generation templates based on the plurality of task-oriented dialog data;
      generates a simulated task-oriented dialog based on the plurality of natural language understanding pairs, the plurality of goal pairs, and the plurality of natural language generation templates;
      generates simulation results from the simulated task-oriented dialog; and
      generates, based on simulation results, an actionable suggestion relating to an adjustment to the dialog agent.

9. The system of claim 8, wherein the plurality of task-oriented dialog data comprises responses to application programming interface (API) calls to the dialog agent.

10. The system of claim 8, wherein the plurality of task-oriented dialog data comprises metadata associated with the dialog agent.

11. The system of claim 8, wherein the one or more hardware processors further:
    determines an intent training utterance based on the plurality of task-oriented dialog data.

12. The system of claim 11, wherein the one or more hardware processors further:
    generates, by a plurality of models, a plurality of paraphrases based on the intent training utterance.

13. The system of claim 12, wherein the one or more hardware processors further:

filters the plurality of paraphrases based on a similarity metric to produce a subset of the plurality of paraphrases.

14. The system of claim 13, wherein the one or more hardware processors further:
generates the simulated task-oriented dialog based on the subset of the plurality of paraphrases.

15. A processor-readable non-transitory storage medium storing a plurality of processor-executable instructions, the instructions being executed by a processor to perform operations comprising:
receiving, via a communication interface, a plurality of task-oriented dialog data generated from a dialog agent;
determining a plurality of natural language understanding pairs including bot dialog acts and respective bot messages based on the plurality of task-oriented dialog data;
determining a plurality of goal pairs including goal entity slots and respective goal entity slot values based on the plurality of task-oriented dialog data;
determining a plurality of natural language generation templates based on the plurality of task-oriented dialog data;
generating a simulated task-oriented dialog based on the plurality of natural language understanding pairs, the plurality of goal pairs, and the plurality of natural language generation templates;
generating simulation results from the simulated task-oriented dialog; and
generating, based on simulation results, an actionable suggestion relating to an adjustment to the dialog agent.

16. The processor-readable non-transitory storage medium of claim 15, wherein the plurality of task-oriented dialog data comprises metadata associated with the dialog agent.

17. The processor-readable non-transitory storage medium of claim 15, further comprising:
determining an intent training utterance based on the plurality of task-oriented dialog data.

18. The processor-readable non-transitory storage medium of claim 17, further comprising:
generating, by a plurality of models, a plurality of paraphrases based on the intent training utterance.

19. The processor-readable non-transitory storage medium of claim 18, further comprising:
filtering the plurality of paraphrases based on a similarity metric to produce a subset of the plurality of paraphrases.

20. The processor-readable non-transitory storage medium of claim 19, further comprising:
generating the simulated task-oriented dialog based on the subset of the plurality of paraphrases.

* * * * *